(12) United States Patent
Wiegand et al.

(10) Patent No.: US 9,860,563 B2
(45) Date of Patent: *Jan. 2, 2018

(54) HYBRID VIDEO CODING SUPPORTING INTERMEDIATE VIEW SYNTHESIS

(71) Applicant: GE Video Compression, LLC, Albany, NY (US)

(72) Inventors: Thomas Wiegand, Berlin (DE); Karsten Mueller, Berlin (DE); Philipp Merkle, Berlin (DE)

(73) Assignee: GE VIDEO COMPRESSION, LLC, Albany, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/257,447

(22) Filed: Sep. 6, 2016

(65) Prior Publication Data

US 2016/0381392 A1     Dec. 29, 2016

Related U.S. Application Data

(63) Continuation of application No. 14/743,094, filed on Jun. 18, 2015, now Pat. No. 9,462,276, which is a
(Continued)

(51) Int. Cl.
*H04N 19/17*     (2014.01)
*H04N 19/11*     (2014.01)
(Continued)

(52) U.S. Cl.
CPC ....... *H04N 19/597* (2014.11); *H04N 13/0011* (2013.01); *H04N 19/105* (2014.11);
(Continued)

(58) Field of Classification Search
CPC .......... H04N 13/0239; H04N 13/0055; H04N 13/0296; H04N 13/0497; H04N 13/0059;
(Continued)

(56) References Cited

U.S. PATENT DOCUMENTS 8,682,087 B2    3/2014 Tian
2007/0014477 A1    1/2007 MacInnis et al.
(Continued)

OTHER PUBLICATIONS

Office Action dated Mar. 30, 2017 in European Application No. 15186282.8.
(Continued)

*Primary Examiner* — Sath V Perungavoor
*Assistant Examiner* — Howard D Brown, Jr.
(74) *Attorney, Agent, or Firm* — Pillsbury Winthrop Shaw Pittman LLP

(57) ABSTRACT

Hybrid video decoder supporting intermediate view synthesis of an intermediate view video from a first- and a second-view video which are predictively coded into a multi-view data signal with frames of the second-view video being spatially subdivided into sub-regions and the multi-view data signal having a prediction mode is provided, having: an extractor configured to respectively extract, from the multi-view data signal, for sub-regions of the frames of the second-view video, a disparity vector and a prediction residual; a predictive reconstructor configured to reconstruct the sub-regions of the frames of the second-view video, by generating a prediction from a reconstructed version of a portion of frames of the first-view video using the disparity vectors and a prediction residual for the respective sub-regions; and an intermediate view synthesizer configured to reconstruct first portions of the intermediate view video.

24 Claims, 6 Drawing Sheets

Related U.S. Application Data continuation of application No. 13/739,365, filed on Jan. 11, 2013, now Pat. No. 9,118,897, which is a continuation of application No. PCT/EP2010/060202, filed on Jul. 15, 2010.

(51) Int. Cl.

| | | |
|---|---|---|
| *H04N 19/597* | (2014.01) | |
| *H04N 13/00* | (2006.01) | |
| *H04N 19/105* | (2014.01) | |
| *H04N 19/46* | (2014.01) | |
| *H04N 19/513* | (2014.01) | |
| *H04N 19/61* | (2014.01) | |
| *H04N 19/109* | (2014.01) | |
| *H04N 19/172* | (2014.01) | |
| *H04N 19/177* | (2014.01) | |
| *H04N 19/567* | (2014.01) | |
| *H04N 19/124* | (2014.01) | |
| *H04N 19/30* | (2014.01) | |
| *H04N 19/80* | (2014.01) | |

(52) U.S. Cl.
CPC ........... *H04N 19/109* (2014.11); *H04N 19/11* (2014.11); *H04N 19/124* (2014.11); *H04N 19/17* (2014.11); *H04N 19/172* (2014.11); *H04N 19/177* (2014.11); *H04N 19/30* (2014.11); *H04N 19/46* (2014.11); *H04N 19/513* (2014.11); *H04N 19/521* (2014.11); *H04N 19/567* (2014.11); *H04N 19/61* (2014.11); *H04N 19/80* (2014.11); *H04N 2013/0081* (2013.01)

(58) Field of Classification Search
CPC .... H04N 19/597; H04N 19/80; H04N 19/124; H04N 19/30; H04N 19/172; H04N 19/567; H04N 19/177; H04N 19/521; H04N 19/46; H04N 19/17; H04N 19/105; H04N 19/11; H04N 19/61; H04N 19/513; H04N 19/10

See application file for complete search history.

(56) References Cited

U.S. PATENT DOCUMENTS

| | | |
|---|---|---|
| 2008/0247462 A1 | 10/2008 | Demos |
| 2010/0259596 A1 | 10/2010 | Park et al. |
| 2011/0064262 A1 | 3/2011 | Chen et al. |
| 2011/0222602 A1* | 9/2011 | Sung .................... H04N 21/235 375/240.12 |
| 2011/0254921 A1 | 10/2011 | Pahalawatta et al. |
| 2011/0280316 A1 | 11/2011 | Chen et al. |
| 2012/0133736 A1 | 5/2012 | Nishi et al. |
| 2012/0250982 A1 | 10/2012 | Ito et al. |
| 2013/0022113 A1 | 1/2013 | Chen et al. |
| 2013/0148722 A1 | 6/2013 | Zhang et al. |
| 2013/0170552 A1 | 7/2013 | Kim et al. |
| 2013/0229485 A1 | 9/2013 | Rusanovskyy et al. |
| 2013/0242051 A1* | 9/2013 | Balogh .................. G06T 9/001 348/43 |
| 2013/0279576 A1 | 10/2013 | Chen et al. |
| 2014/0028793 A1 | 1/2014 | Wiegand |
| 2014/0218473 A1* | 8/2014 | Hannuksela ......... H04N 19/597 348/43 |

OTHER PUBLICATIONS

European Search Report dated Jan. 28, 2016, in parallel European Patent Application No. 15186282.8, 8 pages.

Chang, Gan-Chieh, et al., "Multi-View Image Compression and Intermediate View Synthesis for Stereoscopic Applications", Circuits and Systems, 2000, Proceedings, ISCAS 2000 Geneva, The 2000 1 EEE International Symposium on May 28-31, 2000, Piscataway, NJ, US, IEEE, vol. 2, May 28, 2000, pp. 277-280, XP010502715, ISBN: 978-0-7803-5482-1, 4 pages.

Lie, et al., "Intermediate view synthesis from binocular images for stereoscopic applications", The 2001 IEEE international symposium on circuits and systems, 2001, ISCAS, 2001, vol, 5, May 6-9, 2001, pp. 287-290, 4 pages.

Ho, et al., "Overview of Multi-view Video Coding," 14th International Workshop on Systems, Signals and Images Processing and 6th EURASIP Conference Focused on Speech and Image Processing, Multimedia Communications and Services, Jun. 1, 2007, pp. 5-12, 8 pages.

Official Communication, dated Nov. 25, 2013, issued in parallel European Patent Application No. 10 734 970.6, 6 pages.

ISO/IEC JTC1/SC29/WG11, "Text of ISO/IEC 14496-10:2008/FDAM 1 Multiview Video Coding", Doc. N9978, Hannover, Germany, Jul. 2008, ITU-T and ISO/IEC JTC1, 69 pages.

International Telecommunication Union, "Series H: Audiovisual and Multimedia Systems, Infrastructure of audiovisual services—Coding of moving video: Advanced video coding for generic audiovisual services," ITU-T Recommendation H.264 and ISO/IEC 14496-10(MPEG-4 AVC), 670 pages.

Notice of Allowance dated Aug. 21, 2017 in U.S. Appl. No. 15/257,376.

* cited by examiner

HYBRID VIDEO CODING SUPPORTING INTERMEDIATE VIEW SYNTHESIS

CROSS-REFERENCE TO RELATED APPLICATIONS

This application is a continuation of U.S. patent application Ser. No. 14/743,094, filed Jun. 18, 2015, which is a continuation of U.S. patent application Ser. No. 13/739,365, filed Jan. 11, 2013 (now U.S. Pat. No. 9,118,897, issued Aug. 25, 2015), which is a continuation of International Application No. PCT/EP2010/060202, filed Jul. 15, 2010, which are incorporated herein by reference their entireties.

BACKGROUND OF THE INVENTION

The present invention is concerned with hybrid video coding supporting intermediate view synthesis.

3D video applications such as stereo and multi-view displays, free view point video applications, etc. currently represent booming markets. For stereo and multi-view video content, the MVC Standard has been specified. Reference is made to ISO/IEC JTC1/SC29/WG11, "Text of ISO/IEC 14496-10:2008/FDAM 1 Multiview Video Coding", Doc. N9978, Hannover, Germany, July 2008, ITU-T and ISO/IEC JTC1, "Advanced video coding for generic audiovisual services," ITU-T Recommendation H.264 and ISO/IEC 14496-10(MPEG-4 AVC), Version 1: May 2003, Version 2: May 2004, Version 3: Mar. 2005 (including FRExt extension), Version 4: Sep. 2005, Version 5 and Version 6: June 2006, Version 7: Apr. 2007, Version 8: July 2007 (including SVC extension), Version 9: July 2009 (including MVC extension).

This standard compresses video sequences from a number of adjacent cameras. The MVC decoding process only reproduces these camera views at their original camera positions. For different multi-view displays, however, different numbers of views with different spatial positions are needed, such that additional views, e.g. between the original camera positions, are needed. Thus, in order to be suitable for all different multi-view displays, multi-view video content according to the MVC Standard would have to convey a huge amount of camera views which would, necessarily, lower the compression ratio relative to the lowest compression rate possible for multi-view displays merely exploiting a proper subset of the camera views conveyed. Other techniques for conveying multi-view data provide each sample of the frames of the camera views not only with the corresponding color value, but also a corresponding depth or disparity value based on which an intermediate view synthesizer at the decoding stage may render intermediate views by projecting and merging neighboring camera views into the intermediate view in question. Obviously, the ability to synthesize intermediate views at the decoding stage reduces the number of camera views to be conveyed via the multi-view data. Disadvantageously, however, the provision of each sample with an associated depth or disparity value increases the amount of data to be conveyed per camera view. Further, the depth or disparity data added to the color data has either to be treated like a fourth color component so as to be able to use an appropriate video codec for compressing the data, or an appropriate compression technique has to be used in order to compress the color plus depth/disparity data. The first alternative does not achieve the maximum compression rate possible since the differing statistics of the color and depth values are not considered correctly, and the latter alternative is cumbersome since a proprietary solution has to be designed, and the degree of computational load at the synthesizing side is relatively high.

In general, it would be favorable if, on one hand, the amount of multi-view data could be kept reasonably low, while on the other hand, the number of views available at the decoding side is of a reasonably high quality.

SUMMARY

According to an embodiment, a hybrid video decoder supporting intermediate view synthesis of an intermediate view video from a first- and a second-view video which are predictively coded into a multi-view data signal with frames of the second-view video being spatially subdivided into sub-regions and the multi-view data signal having a prediction mode out of a set of possible prediction modes, associated with each of the sub-regions, wherein the set of possible prediction modes has at least an inter-view prediction mode and an intra-view prediction mode, wherein the hybrid video decoder may have an extractor configured to respectively extract, from the multi-view data signal, for sub-regions of the frames of the second-view video with which the inter-view prediction mode is associated, a disparity vector and a prediction residual; a predictive reconstructor configured to reconstruct the sub-regions of the frames of the second-view video with which the inter-view prediction mode is associated, by generating a prediction from a reconstructed version of a portion of frames of the first-view video using the disparity vectors extracted from the multi-view data signals for the respective sub-regions, and the prediction residual for the respective sub-regions; and an intermediate view synthesizer configured to reconstruct first portions of the intermediate view video using the reconstructed version of the portions of the frames of the first-view video, and the disparity vectors extracted from the multi-view data signal, wherein the intermediate view synthesizer is configured to reconstruct fourth portions of the intermediate view video other than the first portions by temporally and/or spatially interpolating disparity vectors extracted from the multi-view data signal for the sub-regions of the frames of the second-view video with which the inter-view prediction mode is associated, to acquire disparity vectors for sub-regions with which the intra-view prediction mode is associated.

According to another embodiment, a hybrid video decoding method is disclosed supporting intermediate view synthesis of an intermediate view video from a first- and a second-view video which are predictively coded into a multi-view data signal with frames of the second-view video being spatially subdivided into sub-regions and the multi-view data signal having a prediction mode out of a set of possible prediction modes, associated with each of the sub-regions, wherein the set of possible prediction modes has at least an inter-view prediction mode and an intra-view prediction mode, wherein the hybrid video decoding method may have the steps of respectively extracting, from the multi-view data signal, for sub-regions of the frames of the second-view video with which the inter-view prediction mode is associated, a disparity vector and a prediction residual; predictively reconstructing the sub-regions of the frames of the second-view video with which the inter-view prediction mode is associated, by generating a prediction from a reconstructed version of a portion of frames of the first-view video using the disparity vectors extracted from the multi-view data signals for the respective sub-regions, and the prediction residual for the respective sub-regions;

and reconstructing first portions of the intermediate view video using the reconstructed version of the portions of the frames of the first-view video, and the disparity vectors extracted from the multi-view data signal wherein the method further has reconstructing fourth portions of the intermediate view video other than the first portions by temporally and/or spatially interpolating disparity vectors extracted from the multi-view data signal for the sub-regions of the frames of the second-view video with which the inter-view prediction mode is associated, to acquire disparity vectors for sub-regions with which the intra-view prediction mode is associated.

According to another embodiment, a multi-view data signal may have a first- and a second-view video predictively coded therein with frames of the second-view video being spatially subdivided into sub-regions and the multi-view data signal having a prediction mode out of a set of possible prediction modes, associated with each of the sub-regions, wherein the set of possible prediction modes has at least an inter-view prediction mode and an intra-view prediction mode, the multi-view data signal having, for sub-regions of the frames of the second-view video with which the inter-view prediction mode is associated, a disparity vector, a prediction residual and reliability data, with the reliability data being determined in dependence on a function which monotonically increases with decreasing value of a dispersion measure of the distribution of a resulting prediction error at a set of disparity vectors when plotted against a distance of the respective one of the set of disparity vectors from the disparity vector inserted into the multi-view data signal.

According to another embodiment, a hybrid video encoder for predictively encoding a first- and a second-view video into a multi-view data signal with frames of the second-view video being spatially subdivided into sub-regions may be the hybrid video encoder may be configured to assign a prediction mode out of a set of possible prediction modes, to each of the sub-regions of the frames of the second-view video, wherein the set of possible prediction modes has at least an inter-view prediction mode and an intra-view prediction mode; respectively determine, for sub-regions of the frames of the second-view video with which the inter-view prediction mode is associated, a disparity vector among disparity vectors out of a set of disparity vectors lying within a predetermined search area, which correspond to a local minimum of a respective prediction error resulting from applying the respective disparity vector to a reconstructed version of a portion of frames of the first-view video, and the prediction residual for the respective sub-regions, resulting from applying the disparity vector determined; and respectively inserting, for sub-regions of the frames of the second-view video with which the inter-view prediction mode is associated, the disparity vector determined, the prediction residual determined, and reliability data into the multi-view data signal, with the reliability data being determined in dependence on a function which monotonically increases with decreasing value of a dispersion measure of the distribution of a resulting prediction error at the set of disparity vectors when plotted against a distance of the respective one of the set of disparity vectors from the disparity vector inserted into the multi-view data signal.

According to another embodiment, a hybrid video encoding method for predictively encoding a first- and a second-view video into a multi-view data signal with frames of the second-view video being spatially subdivided into sub-regions may have the steps of assigning a prediction mode out of a set of possible prediction modes, to each of the sub-regions of the frames of the second-view video, wherein the set of possible prediction modes has at least an inter-view prediction mode and an intra-view prediction mode; respectively determining, for sub-regions of the frames of the second-view video with which the inter-view prediction mode is associated, a disparity vector among disparity vectors out of a set of disparity vectors lying within a predetermined search area, which correspond to a local minimum of a respective prediction error resulting from applying the respective disparity vector to a reconstructed version of a portion of frames of the first-view video, and the prediction residual for the respective sub-regions, resulting from applying the disparity vector determined; and respectively inserting, for sub-regions of the frames of the second-view video with which the inter-view prediction mode is associated, the disparity vector determined, the prediction residual determined, and reliability data into the multi-view data signal, with the reliability data being determined in dependence on a function which monotonically increases with decreasing value of a dispersion measure of the distribution of a resulting prediction error at the set of disparity vectors when plotted against a distance of the respective one of the set of disparity vectors from the disparity vector inserted into the multi-view data signal.

According to another embodiment, a computer program may have a program code for performing, when running on a computer, a hybrid video decoding method supporting intermediate view synthesis of an intermediate view video from a first- and a second-view video which are predictively coded into a multi-view data signal with frames of the second-view video being spatially subdivided into sub-regions and the multi-view data signal having a prediction mode out of a set of possible prediction modes, associated with each of the sub-regions, wherein the set of possible prediction modes has at least an inter-view prediction mode and an intra-view prediction mode, wherein the hybrid video decoding method may have the steps of respectively extracting, from the multi-view data signal, for sub-regions of the frames of the second-view video with which the inter-view prediction mode is associated, a disparity vector and a prediction residual; predictively reconstructing the sub-regions of the frames of the second-view video with which the inter-view prediction mode is associated, by generating a prediction from a reconstructed version of a portion of frames of the first-view video using the disparity vectors extracted from the multi-view data signals for the respective sub-regions, and the prediction residual for the respective sub-regions; and reconstructing first portions of the intermediate view video using the reconstructed version of the portions of the frames of the first-view video, and the disparity vectors extracted from the multi-view data signal, wherein the method further has reconstructing fourth portions of the intermediate view video other than the first portions by temporally and/or spatially interpolating disparity vectors extracted from the multi-view data signal for the sub-regions of the frames of the second-view video with which the inter-view prediction mode is associated, to acquire disparity vectors for sub-regions with which the intra-view prediction mode is associated.

According to another embodiment, a computer program may have a program code for performing, when running on a computer, a hybrid video encoding method for predictively encoding a first- and a second-view video into a multi-view data signal with frames of the second-view video being spatially subdivided into sub-regions, wherein the hybrid video encoding method may have the steps of assigning a prediction mode out of a set of possible prediction modes, to each of the sub-regions of the frames of the second-view video, wherein the set of possible prediction modes has at least an inter-view prediction mode and an intra-view prediction mode; respectively determining, for sub-regions of the frames of the second-view video with which the inter-view prediction mode is associated, a disparity vector among disparity vectors out of a set of disparity vectors lying within a predetermined search area, which correspond to a local minimum of a respective prediction error resulting from applying the respective disparity vector to a reconstructed version of a portion of frames of the first-view video, and the prediction residual for the respective sub-regions, resulting from applying the disparity vector determined; and respectively inserting, for sub-regions of the frames of the second-view video with which the inter-view prediction mode is associated, the disparity vector determined, the prediction residual determined, and reliability data into the multi-view data signal, with the reliability data being determined in dependence on a function which monotonically increases with decreasing value of a dispersion measure of the distribution of a resulting prediction error at the set of disparity vectors when plotted against a distance of the respective one of the set of disparity vectors from the disparity vector inserted into the multi-view data signal.

The present invention is, inter alias, based on the finding that the hybrid video codecs according to which videos of multiple views are predictively coded into a multi-view data signal with frames of a video of a certain view being spatially subdivided into sub-regions and the multi-view data signal having a prediction mode out of a set of possible prediction modes, associated with each of the sub-regions, the set of possible prediction modes having at least an inter-view prediction mode and an intra-view prediction mode, already convey enough information in order to enable an intermediate view synthesis at the hybrid video decoding side. That is, no proprietary multi-view data format according to which the color data is accompanied by additional per-pixel depth and/or disparity data is needed. In other words, the inventors of the present application found out that even when the hybrid video encoder is given the freedom to freely select the advantageous prediction mode out of the possible prediction modes for each sub-region—according to some optimization scheme for optimizing a rate/distortion measure, or the like—, the disparity vectors actually conveyed within the resulting multi-view data signal for the sub-regions for which the inter-view prediction mode has been chosen, are enough in order to enable an intermediate view synthesis at the hybrid video decoding stage. That is, while a predictive reconstructor reconstructs sub-regions of frames of a video of a certain view of the multi-view data signal, with which the inter-view prediction mode is associated, by generating a prediction from a reconstructed version of a portion of frames of a video of another view of the multi-viewed data signal using the disparity vectors extracted from the multi-view data signal for the respective sub-regions, and a prediction residual for the respective sub-regions also extracted from the multi-view data signal, an intermediate view synthesizer may reconstruct portions of an intermediate view video using the reconstructed version of the portions of the frames of the video of the certain view, and the disparity vectors extracted from the multi-view data signal. Remaining portions of the intermediate view video not being reconstructed using the disparity vectors extracted from the multi-view data signal—since the hybrid video encoder decided to use intra-view prediction code for other sub-regions—, may be subsequently filled by way of intra/extrapolation in time and/or spatially, or by estimating additional disparity vectors by interpolating disparity vectors extracted from the multi-view data signal, temporally and/or spatially.

BRIEF DESCRIPTION OF THE DRAWINGS

Embodiments of the present invention will be detailed subsequently referring to the appended drawings, in which.

DETAILED DESCRIPTION OF THE INVENTION

Before describing various embodiments of a hybrid video decoder or a hybrid video decoding method as well as a corresponding hybrid video encoder or a hybrid video encoding method, these embodiments are motivated by firstly explaining the use of disparity vectors in predictively coding multiple-view data.

If scene content is captured with multiple cameras, a 3D perception of this content can be presented to a viewer. To this end, stereo paths have to be provided with a slightly different viewing direction for the left and right eye. The shift of the same content in both views for equal time instances is represented by the so-called parallax. In other words, the parallax describes a shift of samples within one view relative to the corresponding positions within another view. Since both views show the same scene content, both views are very similar within the portions related to each other by way of the parallax. Similarly, consecutive frames of a video corresponding to an individual view comprise similarities among each other. For example, in case of a non-moving camera, samples corresponding to a static background should appear constantly within consecutive frames of the video at spatially co-located positions. Moving objects within the scene content change their positions within consecutive frames of the video. In hybrid video compression techniques, the similarities among temporally consecutive frames is exploited by way of motion-compensated prediction according to which motion vectors are used in order to obtain predictions for certain sub-regions of a frame based on previously coded and reconstructed portions of other frames, mainly by mapping portions thereof into the sub-region in question.

Figure 1:
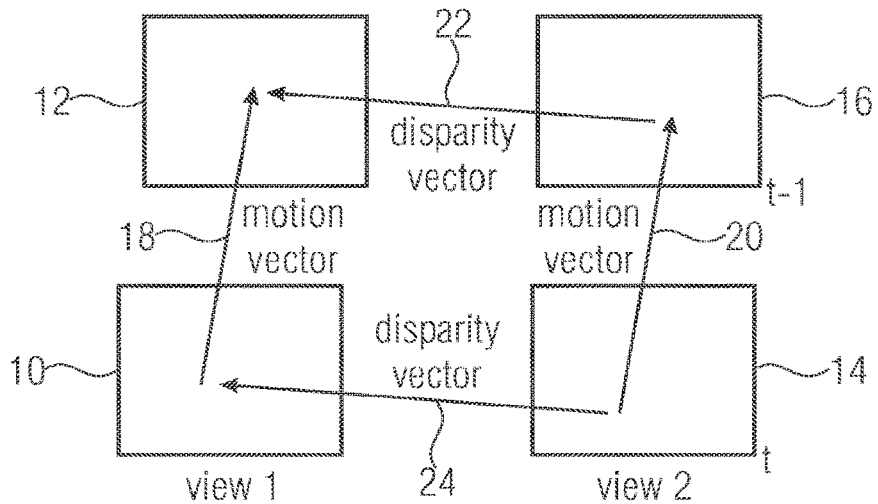
FIG. 1 shows a schematic diagram illustrating the coexistence of motion and disparity vectors in a multi-view coding scheme regarding an example including two views and two time instances, underlying the hybrid coding and decoding scheme described with respect to FIGS. 5 to 8.

Similarly, in order to compress multi-view data, the similarity between the frames of the same time instant of spatially distinct but similar view directions may be exploited in order to predictively compress the video content of these views. The shift of the same content in both views for equal time instances may be represented by disparity vectors. This shift is comparable to the content shift within a sequence of frames between different time instances represented by the aforementioned motion vectors. FIG. 1 illustrates the co-use of disparity vectors and motion vectors in order to reduce the redundancy of multi-view data for an illustrative case of two views at two time instances.

In particular, FIG. 1 shows a frame 10 of a first view corresponding to a time instant t and a second frame 12 of the same view 1 corresponding to time instant t-1, and further, a frame 14 of a second view corresponding to time instant t and a further frame 16 of the view 2 at time instant t-1 is shown. A motion vector 18 illustrates the spatial displacement of similar scene content within the consecutive frames 10 and 12 of the first view, with a motion vector 20 similarly illustrating the spatial displacement of mutually corresponding scene content with in the consecutive frames 14 and 16 of the second view. As explained above, the motion of mutually corresponding scene content within consecutive frames within an individual view spatially varies, depending on the scene content, and thus, in hybrid video coding to which the following embodiments relate, the motion vectors are individually assigned for different sub-regions of the frames 10 to 16 in order to indicate, for the respective sub-region, how the reference frame to which the respective motion vector 18 and 20 points or refers to, is to be displaced in order to serve as a prediction at the respective sub-region of the current frame. Insofar, in FIG. 1, frames 12 and 16 represent the reference frames for predicting portions of frames 10 and 14, respectively, using motion vectors 18 and 20, respectively. A hybrid video encoder may be configured to set the motion vectors 18 and 20 such that a certain rate/distortion measure is minimized with considering that representing the motion vectors 18 and 20 at a final resolution increases the bit rate needed to convey the motion information while, on the other hand, increasing the prediction quality and therefore, reducing the prediction error and the bit rate needed for coding the prediction error. In order to determine the motion vector for a certain sub-region, the hybrid video encoder may, for example, determine the similarity of portions of the reference frame 12 and 16, respectively, displaced relative to the sub-region in question within the current frame 10 and 14, respectively, by different possible motion vectors with choosing, as motion vector candidates, those motion vectors leading to low or local minimum prediction error such as measured by the mean quadratic error.

In a similar sense, disparity vectors 22 and 24, respectively, show a spatial displacement of mutually corresponding scene contents within frames 12, 16 and 10, 14 at the same time instant of the different views 1 and 2, and the hybrid video and encoder may set these disparity vectors 22 in a manner corresponding to the determination of the motion vectors 18 and 20 outlined above with, for example, frames 10 and 12 of view 1 representing the reference frames for the disparity vectors 22 and 24, which in turn help the reference frames 12 and 10 are to be spatially displaced in order to serve as a prediction for sub-regions of frames 14 and 16 to which the disparity vectors 22 and 24 correspond.

Therefore, motion estimation as performed by a hybrid video encoder, is applicable not only to the temporal direction, but also in an inter-view direction. In other words, if multiple views are coded together, the temporal and inter-view directions may be treated similarly, such that motion estimation is carried out in temporal as well as inter-view direction during encoding. The estimated motion vectors in inter-view direction are the disparity vectors 22 and 24. As the disparity vectors correspond to the special displacement of mutually corresponding scene content within different views, such hybrid video encoders also carry out disparity estimation implicitly and the disparity vectors 22 and 24 as included in the coded bitstream, may be exploited for inter-view synthesis as will be outlined in more detail below. These vectors 22 and 24 can be used for additional intermediate view synthesis at the decoder.

Figure 2:
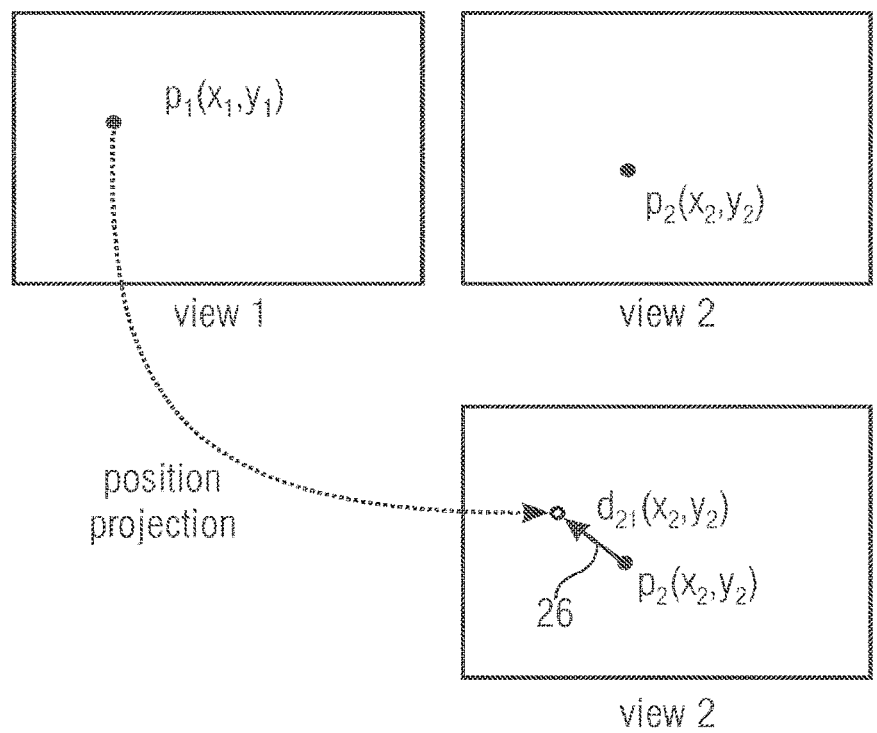
FIG. 2 shows a schematic diagram illustrating the point correspondences defined by a disparity vector between adjacent views in accordance with an embodiment of the present invention.

In order to illustrate this in more detail, reference is made to FIG. 2. Consider a pixel $p_1(x_1y_1)$ in view 1 at position $(x_1,y_1)$ and a pixel $p_2(x_2,y_2)$ in view 2 at position $(x_2,y_2)$, which have identical luminance values or, in other words, represent mutually corresponding scene samples. Then, consider a pixel $p_1$ $(x_1,y_1)$ in view 1 at position $(x_1,y_1)$ and a pixel $p_2(x_2,y_2)$ in view 2 at position $(x_2,y_2)$, which have identical luminance values. Then, $$p_1(x_1,y_1)=p_2(x_2,y_2) \qquad (1)$$

Their positions $(x_1,y_1)$ and $(x_2,y_2)$ are connected by the 2D disparity vector 26, e.g. from view 2 to view 1, which is $d_{21}(x_2,y_2)$ with components $d_{x,21}(x_2,y_2)$ and $d_{y,21}(x_2,y_2)$. Thus, the following equation holds:

$$(x_1,y_1)=(x_2+d_{x,21}(x_2,y_2),y_2+d_{y,21}(x_2,y_2)) \qquad (2)$$

combining (1) and (2), $$p_1(x_2,d_{x,21}(x_2,y_2),y_2+d_{y,21}(x_2,y_2))=p_2(x_2,y_2) \qquad (3)$$

Figure 3:
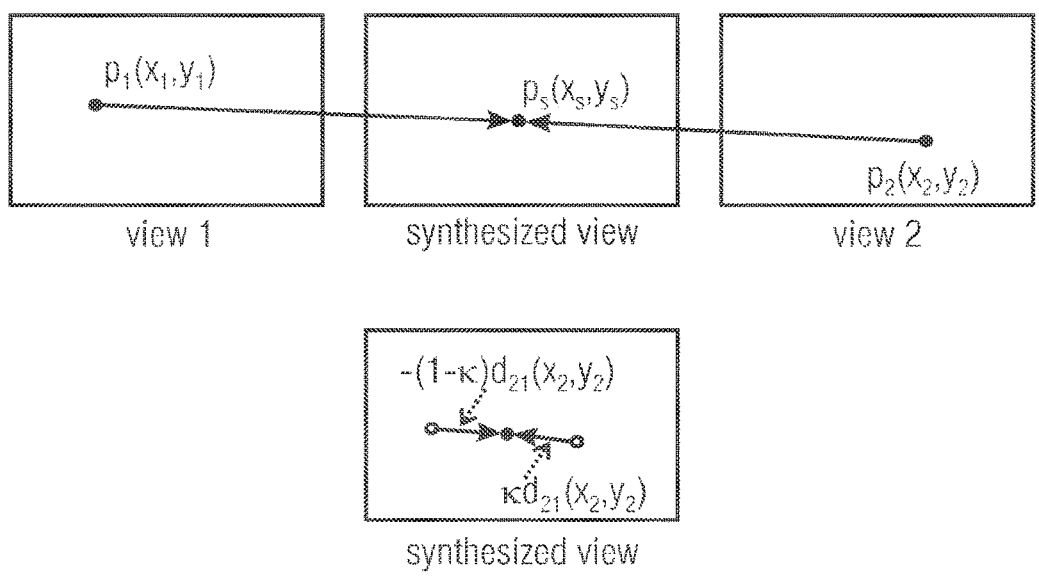
FIG. 3 shows a schematic diagram illustrating an intermediate view synthesis by scene content projection from two neighboring views using scaled disparity vectors in accordance with an embodiment of the present invention.

As shown in FIG. 2, bottom right, two points with identical content can be connected with a disparity vector 26: Adding this vector to the coordinates of $p_2$, gives the position of pi in image coordinates. If the disparity vector $d_{21}(x_2,y_2)$ is now scaled by a factor $\kappa=[0 \ldots 1]$, any intermediate position between $(x_1,y_1)$ and $(x_2,y_2)$ can be addressed. Therefore, intermediate views can be generated by shifting the image content of view 1 and/or view 2 by scaled disparity vectors. An example is shown in FIG. 3 for an intermediate view Therefore, new intermediate views can be generated with any position between view 1 and view 2.

Beyond this, also view extrapolation can also be achieved by using scaling factors $\kappa<0$ and $\kappa>1$ for the disparities.

These scaling methods can also be applied in temporal direction, such that new frames can be extracted by scaling the motion vectors, which leads to the generation of higher frame rate video sequences.

After having illustrated the possibility to use the disparity vectors as generated and transmitted by a hybrid multi-view encoder in intermediate view synthesis, or at least the underlying principles thereof, embodiments for a hybrid video coding scheme supporting intermediate view synthesis are described next. In particular, FIG. 4 shows a hybrid video encoder which is suitable for generating a multi-view data signal based on which hybrid video decoding is enabled, supporting intermediate view synthesis as described with respect to the following FIGS. 5 and 6.

Figure 4:
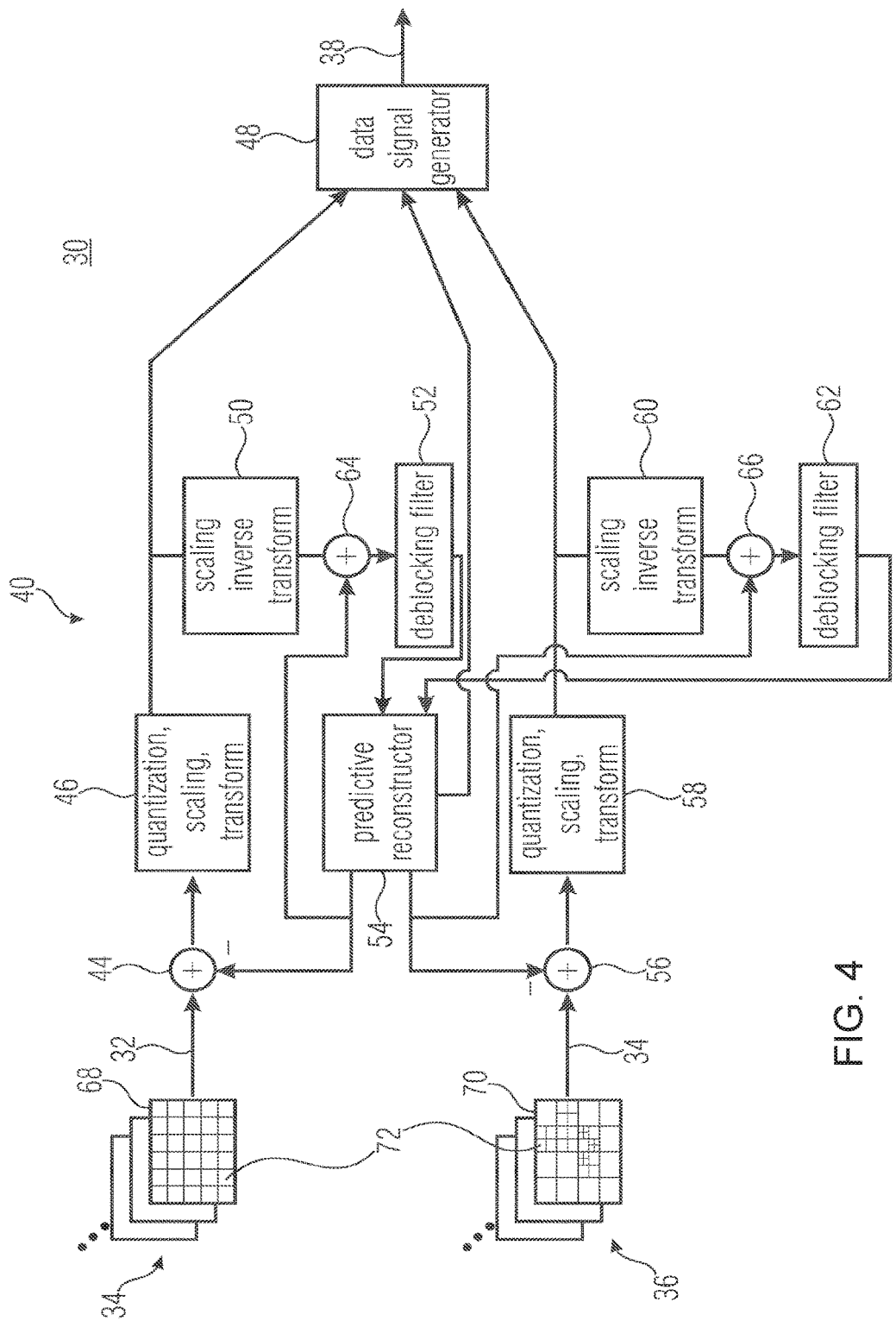
FIG. 4 shows a block diagram of a hybrid video encoder according to an embodiment of the present invention.

The hybrid video encoder according to FIG. 4 is generally indicated with reference sign 30. The hybrid video encoder 30 of FIG. 4 is a predictive encoder supporting one or more inter-view prediction modes, and one or more intra-prediction modes. Further, the hybrid video encoder 30 of FIG. 4 is configured to select and set the prediction mode at a sub-frame granularity, namely in units of sub-regions of the frames of the views to be encoded.

In particular, the hybrid video encoder of FIG. 4 comprises an input 32 for a first-view video 34, and an input 34 for a second-view video 36. The first-view video 34 is considered to be the result of a capturing of a scene from a first view direction, whereas the second-view video 36 is expected to represent a capturing of the same scene from a second view being different from the first view. The first and second views differ, for example, in the view position, i.e. the capturing/camera position, and/or the view angle, i.e. the view axis direction. The first and second views may differ merely in view position with the view axis direction being the same. In general, the first and second views may be positioned relative to each other such that same object locations in the scene, positioned at a mean distance of the scene objects captured by the first and second views, are displaced within the pictures of both views by less than 5 pixels, or, even more advantageous, less than 2 pixels.

Further, the hybrid video encoder 30 of FIG. 4 comprises an output 38 for outputting the multi-view data signal. In between, the hybrid video encoder 30 comprises two prediction estimation loops 40 and 42, respectively, the first one of which is connected between the first input 32 and output 38, and the second one of which is connected between the second input 34 and the output 38. In particular, the first prediction estimation loop 40 comprises a subtractor 44 and a quantization/scaling/transform stage 46 connected, in the order mentioned, between input 32 and a first input of a data signal generator 48, the output of which is connected to output 38. Further, the first prediction loop 40 comprises a rescaling/inverse transform block 15, a deblocking filter 52, and a predictive reconstructor 54, which are connected in the order mentioned between an output of the quantization/scaling/transform stage 46 and an inverting input of subtractor 44. Similarly, the second prediction estimation loop is formed by serially connecting a subtractor 56, a quantization/scaling/transform stage 58, a rescaling/inverse transform block 60, a deblocking filter 62 and the predictive reconstructor 54. To be more precise, the predictive constructor 54 is connected into both prediction estimation loops 40 and 42, respectively, and comprises a first pair of input and output connected into the first prediction estimation loop 40 and a second pair of input and output connected into the second prediction estimation loop 42. Further, subtractor 56 and quantization/scaling/transform stage 58 are connected in the order mentioned between the input 34 an another input of data signal generator 48, while rescaling/inverse transform block 60 and deblocking filter 62 are serially connected in the order mentioned between the output of quantization/scaling/transform stage 58 and the corresponding input of predictive reconstructor 54. Finally, another output of predictive reconstructor 54 is connected to another input of data signal generator 48. Lastly, the output of predictive reconstructor 54 connected into the first prediction estimation loop 40 is also connected to a second input of an adder 64 connected, by its first input, between the rescaling/inverse transform block 50 and deblocking filter 52, and similarly, the other output of predictive reconstructor 54 is also connected to a second input of an adder 66, being via its first input, connected between rescaling/inverse transform block 60 and deblocking filter 62. After having described the general structure of the hybrid video encoder 30 of FIG. 4, its mode of operation is described below.

Each video 34 and 36 consists of a sequence of frames 68 and 70, respectively, with each frame 68 and 70 being an array of samples representing a color value of the scene captured by both videos 34 and 36. Each frame 68 and 70 is sub-divided into sub-regions 72, i.e. groups of immediately adjacent samples of the frames 68 and 70, respectively. The subdivision of the frames may be constant in time for each video 34 and 36, and may spatially correspond to each other when comparing video 34 and 36. For example, the spatial subdivision of the frames into sub-regions may be such, that the sub-regions from a regular arrangement of blocks arranged in columns and rows, as exemplarily shown with respect to frame 68. Alternatively, the spatial subdivision of the frame 68 and 70 into sub-regions may vary in time such as on a frame-by-frame basis. The predictive reconstructor 54 may be responsible for setting the spatial subdivision with the aim of optimizing some rate/distortion measure as outlined in more detail below. To this end, the sub-regions 72 may be the leave blocks of a multi-tree, such as quad-tree, subdivision of the frame 68 and 70 as exemplarily illustrated with respect to video 36. In this case, predictive reconstructor 54 may signal the subdivision selected to the data signal generator 48 to be inserted into the multi-view data signal 38. The sub-division may be designed such that a lower bound of the size of the sub-regions is 4×4 color sample positions, or such that an average of the set of possible sizes of the sub-regions among which the predictive reconstructor may chose during subdivision, is greater than 4×4 samples.

In general, the spatial subdivision of the frames 68 and 70 into sub-regions forms the granularity at which predictive reconstructor 54 assigns different prediction modes to different spatial regions of the frames 68 and 70. As described above, the predictive reconstructor 54 supports, at least, one or more inter-view prediction modes, and one or more intra-view prediction modes. The inter-view prediction mode may be embodied as outlined above with respect to FIGS. 1 and 2 and an example of an intra-view prediction mode is the motion-compensated prediction mode also illustrated above with respect to FIGS. 1 and 2. Further examples for intra-view prediction modes encompass an intra-prediction mode according to which already encoded and reconstructed sample values of neighboring sub-regions of the current frame within the same video or view are used to predict—by inter- or extrapolation, the sample values of a current sub-region 72. A further intra-view prediction mode may suppress any prediction so that the sample values within this sub-region are coded into the multi-view data signal in a non-predicted manner.

Depending on the prediction mode, the prediction reconstructor 54 assigns different prediction information to a currently to be encoded sub-region and signals same to the data signal generator 48 for being introduced into the multi-view data signal at output 38. Generally, this prediction information enables the hybrid video decoder to recover the same prediction result as the prediction reconstructor 54 from previously en/decoded frames.

At subtractor 44, the prediction of the sub-region currently to be encoded is subtracted from the sample values of the sub-region currently to be encoded, whereupon the prediction error thus obtained is quantized and transform-coded in block 46. In particular, block 46 may apply a spectrally decomposing transform onto the prediction error with a subsequent quantization of the transform coefficients. The thus obtained prediction residual data is passed on to data signal generator 48 for an incorporation into the multi-view data signal at output 38, as well as block 50 for reconstructing the prediction error entering block 46 and deviating from the latter merely due to the quantization performed in block 46. Block 50 applies a dequantization followed by an inverse transform onto the transform coefficient levels and outputs the reconstructed prediction residual to the first input of adder 64 where a summation is performed with a prediction previously used in order to obtain the respective prediction residual. Thus, at the output of adder 64, a reconstruction of the current sub-region is output and the deblocking filter 52, which is optional, receives the reconstruction of this sub-region along with the reconstruction of the other sub-regions of the current frame to output a reconstruction of the old, i.e. then previously en/decoded, frame so as to be passed on to predictive reconstructor 54.

The description just presented related to the encoding of sub-regions of frames of the first-view video 34, but this description may be readily transferable to the functionality of the prediction estimation loop 42 with regard to the encoding of sub-regions of frames 70 of the second-view video 36.

As already mentioned above, the predictive reconstructor 54 has to perform many decisions during encoding/compressing the sample values of the frames 68 and 70 of the videos 34 and 36, the decisions concerning, optionally, spatial subdivisions of the frames into sub-regions 72 and, for each sub-region, the selection of a prediction mode to be used for coding the respective sub-region along with the respective prediction details concerning the prediction mode selected. For example, for a sub-region having an inter-view prediction mode associated therewith, predictive reconstructor 54 also determines the aforementioned disparity vector. In particular, predictive reconstructor 54 may be configured to determine exactly one disparity vector per sub-region, while the granularity at which the prediction mode is spatially varied over the frames, may by coarser, such as in units of groups of one or more neighboring sub-regions.

Based on the disparity vector, the prediction for the respective sub-region is determined by mapping positions of the samples of the respective sub-region according to the disparity vector to obtain mapped sampled positions, and adopting the reconstructed version of the temporally corresponding frame of the other one of the videos 34 and 36 at the mapped sample positions as the prediction. The mapping may be a linear mapping such as, for example, a translatory displacement by an amount and direction determined by the disparity vector. In order to optimize the prediction settings, the predictive reconstructor 54 may try different disparity vectors within a certain search area around the zero vector, and determine the resulting prediction error, as well as the resulting bit rate needed to represent the prediction error by quantized form coefficients for these different disparity vectors. The search area, for example, restricts the possible disparity vectors for a certain sub-region to a certain maximum length of the disparity vectors. The direction of possible disparity vectors being subject to respective trials in determining the optimum disparity vector, however, may either be unrestricted or restricted to horizontal directions with keeping in mind that disparities between different views usually extend along the horizontal direction rather than the vertical one. The search area may even extend merely into one horizontal direction relative to the zero vector exploiting that disparities normally point into a certain one of left and right hand side directions.

The predictive reconstructor 54 may be configured to determine, for each sub-region for which the inter-view prediction mode is chosen, a disparity vector. However, predictive reconstructor 54 may also analyze the aforementioned search result of the other trials of possible disparity vectors within the aforementioned search area. For example, predictive reconstructor 54 may be configured to assign a reliability to the disparity vector finally selected. As already described above the disparity vectors selected are not necessarily the one leading to the lowest prediction error, although it is very likely that the prediction error resulting from the selected disparity vector is relatively low. In accordance with an embodiment, the predictive reconstructor 54 determines the reliability assigned to the selected disparity vector finally forwarded to data signal generator 48 depending on the result of the trials of possible disparity vectors within the aforementioned search area such that the reliability is determined in dependence on a function which:

1. monotonically increases with decreasing prediction error and/or
2. monotonically increases with decreasing value of a dispersion measure of the distribution of the resulting prediction error at the tried disparity vectors when plotted against the distance of the respective tried disparity vector from the actually chosen vector.

In effect, the reliability shall be a measure indicating a likelihood that the disparity vector inserted into the multi-view data signal, actually coincides with the real disparity, or as to whether the disparity vector merely corresponds to some artificial similarity of the portions of the time-synchronized frames of the different views. It should be noted that the dispersion measure maintains its dependency from the prediction error even when using the reconstructed, and thus from the bitstream derivable, frames as a reference.

The prediction reconstructor 54 may then be configured to pass on this reliability value along with the associated disparity vector to the data signal generator 48 to be inserted into the multi-view data signal.

In principle, the prediction reconstructor 54 may act in the same manner as described above with respect to the inter-view prediction mode with respect to sub-regions for which a motion-compensation prediction mode has been chosen by predicted reconstructor 54. That is, the predictive reconstructor 54 may determine a motion vector for such sub-regions along with, optionally, an associated reliability, with passing on this prediction information to data signal generator 48 for introduction into the multi-view data signal.

Before describing embodiments for a hybrid video decoder suitable for decoding the multi-view data signal output at output 38, it should be noted that several features described above with respect to FIG. 4 are optional. For example, the prediction error at subtractors 44 and 56 not necessarily needs to be transform coded. Further, in case of a lossless coding, the quantization in blocks 46 and 58 may be left away. Further, the hybrid video encoder in FIG. 4 predictively encodes both videos 34 and 36. However, blocks 56, 58, 60, 62, and 66 may be replaced by another coding engine so as to otherwise encode second-view video 36. As already mentioned above, the deblocking filter 52 and 62 is optional, or may be replaced by another filter, such as an adaptive enhancement filter. Although not explicitly mentioned above, the data signal generator 48 may be configured to code the data received from blocks 46, 54, and 58 into the multi-view data signal by entropy encoding such as Huffman- or arithmetic coding in order to further compress the data. Lastly, it is noted that more than two views or more than two videos 34 and 36 may be present and encoded by the hybrid video encoder of FIG. 4. The extension of the embodiment of FIG. 4 onto more than two views corresponding to the different views of the same scenery should become sufficiently clear from the above description.

In the following, an embodiment for a hybrid video decoder is described with respect to FIG. 5. The hybrid video decoder of FIG. 5 supports intermediate view synthesis of an intermediate view video from the first- and second-view video predictively encoded into the multi-view data signal at output 38 of the hybrid video encoder of FIG. 4. It is briefly recalled that the hybrid video encoder or, because responsible therefore, the predictive reconstructor 54 not necessarily associates each sub-region with the inter-view prediction mode. Rather, the association is performed with the aim of optimizing some rate/distortion measure and insofar, inter-view prediction mode competes with motion-compensated prediction and further intra-view prediction modes optionally available. Nevertheless, the inventors of the present invention found out that the percentage of sub-regions—either measured in number or in frame area—is sufficient in order to exploit the disparity vectors associated with these sub-regions to synthesize an intermediate view video therefrom, i.e. a video showing the same scene as the first and second-view videos, but from another view, namely a view other than the first and second views, which may be positioned locally between the first and second views, but may even be positioned even farer away from one of the first and second views, than the other one of the two.

Figure 5:
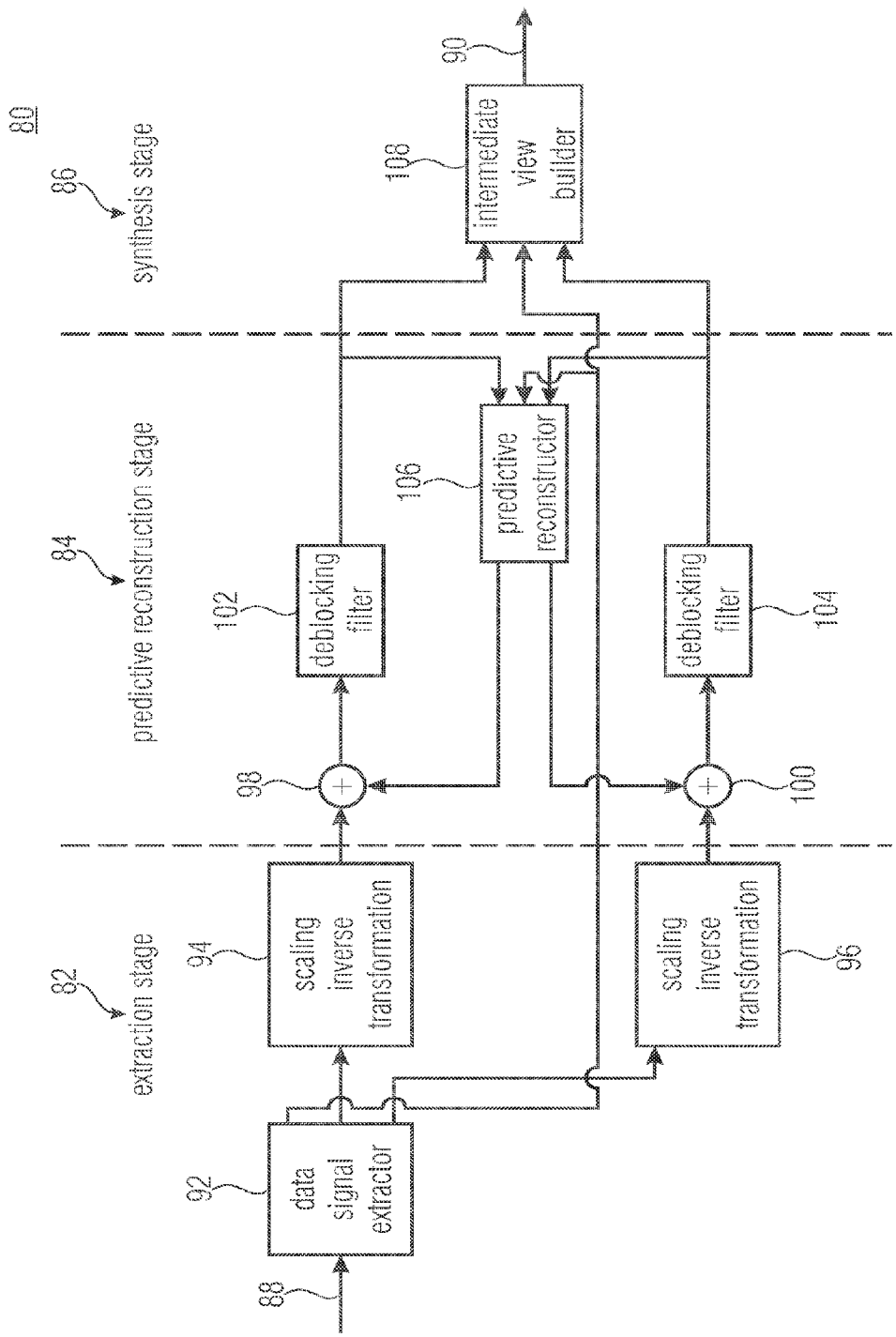
FIG. 5 shows a block diagram of a hybrid video decoder according to an embodiment of the present invention.

The hybrid video decoder of FIG. 5 is generally indicated with reference sign 80. It comprises an extraction stage 82, a predictive reconstruction stage 84 and a synthesizing stage 86. The extraction stage 82 acts as an extractor configured to extract, from the multi-view data signal applied to an input 88 of the hybrid video decoder 80, for sub-regions of the frames, with which the inter-view prediction mode is associated, a disparity vector and a prediction residual. The predictive reconstruction stage 84, in turn, is configured to reconstruct the sub-regions of the frames with which the inter-view prediction mode is associated, by generating a prediction from the reconstructed version of a portion of frames of the reference-view video using the disparity vectors extracted from the multi-view data signal for the respective sub-regions, and the prediction residual for the respective sub-regions. Lastly, the synthesizing stage 86 acts as an intermediate view synthesizer configured to reconstruct first portions of the intermediate view video using the reconstructed version of the portions of the frames of the reference-view video, and the disparity vectors extracted from the multi-view data signal.

The intermediate view video thus obtained is output at an output 90 of hybrid video decoder 80, either alone or along with the first and second view videos represented in the multi-view data signal entering input 88.

To be more precise, the extraction stage 82 comprises a data signal extractor 92, a rescaling/inverse transformation block 94 and a rescaling/inverse transformation block 96. The predictive reconstruction stage 84 comprises adders 98 and 100, deblocking filters 102 and 104, and a predictive reconstructor 106. The synthesizing stage 86 comprises an intermediate view builder 108.

In effect, the hybrid video decoder 80 comprises a first part responsible for reconstructing the first-view video, involving blocks 92, 94, 98, 102, and 106, and a second part responsible for reconstructing the second-view video, involving blocks 92, 96, 100, 104, and 106. That is, data signal extractor 92 and predictive reconstructor 106 participate in the reconstruction of both videos, the first-view and the second-view videos. In effect, components 94, 96, 98, 100, 102, 104, and 106 cooperate in a manner so as to emulate the mode of operation of components 50, 60, 64, 66, 52, 62, and 54 of the hybrid video encoder of FIG. 4. To be more precise, the data signal extractor 92 is configured to extract from the multi-view data signal at input 88, the quantized transform coefficient levels of the sub-regions of the frames of the first-view and the second-view videos and pass on this information to rescaling/inverse transformation blocks 94 and 96, respectively, which in turn act to reconstruct the respective prediction residual of the sub-regions of the frames of the respective first- and second-view video. Further, the data signal extractor 92 extracts from the multi-view data signal at input 88 the prediction information associated with each sub-region. That is, data signal extractor 92 recovers from the multi-view data signal the prediction mode associated with each sub-region. For sub-regions having an inter-view prediction mode associated therewith, data signal extractor 92 extracts a respective disparity vector and, optionally, reliability data. Similarly, data signal extractor 92 extracts from the multi-view data signal a motion vector and, optionally, reliability data for each sub-region having the motion-compensated prediction mode associated therewith. Similarly, for sub-regions having an intra-prediction mode associated therewith, the data signal extractor 92 may recover intra-prediction information from the multi-view data signal such as, for example, a main edge content extension direction. The data signal extractor 92 passes this information on to the predictive reconstructor 106 and the intermediate view builder 108.

The aforementioned components 94 to 106 are interconnected to one another in the manner described above with respect to the elements 46, 50 to 54, and 58 to 66 of FIG. 4. The functionality of these elements is quite the same. That is, predictive reconstructor 106 is configured to generate a prediction for the sub-regions of the frames of both videos from previously decoded and reconstructed versions of portions of frames of the video using the prediction information associated with the respective sub-regions. For example, sub-regions of the inter-view prediction mode are processed by mapping the sample positions thereof as prescribed by the respective disparity vectors and sampling, i.e. deriving the sample values at the mapped sample positions—from the frame of the other video at the same time instant at the sample positions thus obtained by mapping. The sampling may involve an interpolation at sub-sample positions depending on the resolution of the disparity vector. The mapping may, as indicated above, involve or be a translatory displacement into a direction, and by an amount, prescribed by the disparity vector. The same applies to sub-regions of the motion-compensated prediction mode, except for the reference frame, where the sampling or interpolation takes place, being a previously decoded reconstructed frame of the same view video.

The prediction thus obtained is added to the reconstructed prediction residual output by blocks 94 and 96, with the result of the summation representing a reconstruction of the respective sub-region which may, as indicated above, optionally be enhanced by deblocking the filter 102 and 104.

Until now, the description has focused on the mode of operation of the hybrid video decoder of FIG. 5, concerning the construction of the primary views to which the videos having been coded into the multi-view data signal actually relate. However, as indicated above, the hybrid video decoder of FIG. 5 is particularly suitable for synthesizing an intermediate view video from the first- and second-view video explicitly transmitted by way of the multi-view data signal. This synthesizing is performed by intermediate view builder 108 which receives at its input the reconstructed frames of both, explicitly transmitted videos as well as the prediction information, of at least a proper subset of the sub-regions, namely at least the prediction information of the sub-regions having the inter-view prediction mode associated therewith. As will be described in more detail below, intermediate view builder 108 may, however, exploit also other prediction information of other prediction modes and optionally reliability data.

Generally speaking, the intermediate view builder 108 is configured to reconstruct portions of the intermediate view video using the reconstructed version of portions of the frames of any of the primary-view videos explicitly transmitted within the multi-view data signal, and the disparity vectors extracted from the multi-view data signal. The reader is reminded about the statement presented above according to which, most likely, merely a proper subset of the sub-regions of the frames of the first- and second-view video are of the inter-view prediction mode. The other sub-regions do not have disparity vectors associated therewith. Nevertheless, the inventors of the present invention found out that owing to the similarity between frames of neighboring views, the percentage of sub-regions of the inter-view prediction mode is sufficient in order to synthesize an intermediate view video from the first- and second-view videos, thereby avoiding the necessity of providing the multi-view data signal with proprietary per-pixel depth/disparity data.

Figure 6:
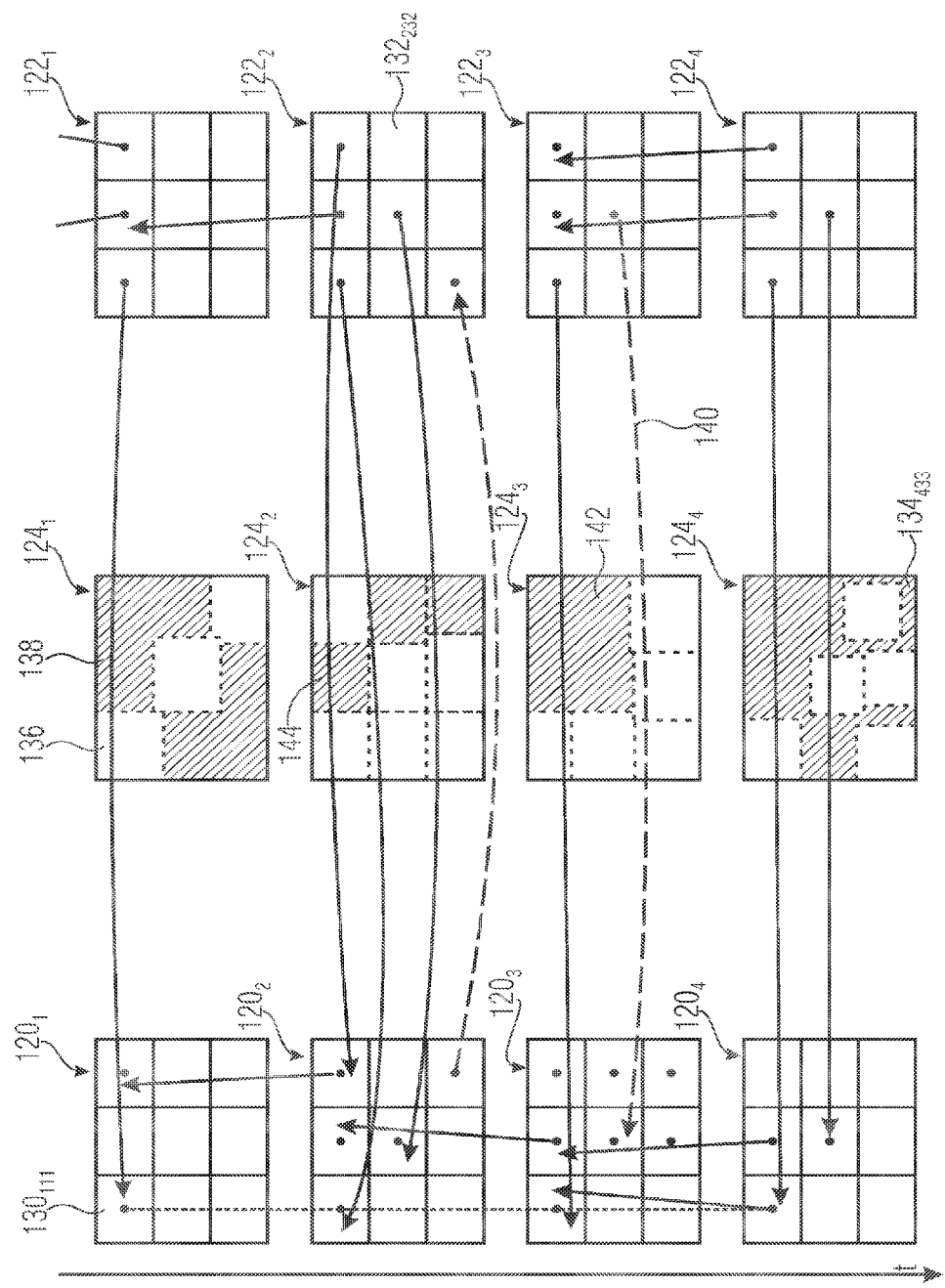
FIG. 6 shows a schematic diagram illustrating the mode of operation of the hybrid video decoder of FIG. 5 with respect to the intermediate view synthesis in accordance with an embodiment of the present invention.

Referring to FIG. 6, different possibilities are described on how the intermediate view builder synthesizes the frames of the intermediate view video. FIG. 6 shows four frames $120_1$ to $120_4$ of the first-view video immediately following each other in time on the left-hand side, four consecutive frames $122_1$ to $122_4$ of the second-view video of the same time instances as frames $120_1$ to $120_4$, on the right-hand side, and four frames to be synthesized $124_1$ to $124_4$ in the mid between the first-video frames and the second-video frames also of the same time instances.

For the sake of a better understanding, the frames $120_1$ to $120_4$ and $122_1$ to $122_4$ are each shown to be subdivided into a regular array of 3×3 sub-regions. In order to keep the number of reference signs at a reasonable level, only one sub-region is explicitly indicated per video, namely sub-region $130_{111}$, sub-region $132_{232}$, and sub-region $134_{433}$. Among the indices, the first digit denotes the frame number, the second digit denotes the column number of the respective sub-region (from left to right), and the third digit indicates the row number of the respective sub-region (from top to bottom), wherein the last digit of the reference number itself, corresponds to the respective last digit of the reference signs indicating the frames of the respective videos, i.e. "0" for the first-view video, "2" for the second-view video, and "4" for the intermediate-view video.

Next, FIG. 6 shows motion and disparity vectors. Motion vectors are shown as pointing from the mid of the associated sub-region to a frame of the same video. That is, motion vectors generally extend vertically. Disparity vectors point from the mid of a certain sub-region to a frame of the other one of the first- and second-view videos. That is, disparity vectors generally extend horizontally in FIG. 6. It should be noted that in FIG. 6, motion vectors are shown to generally point to the immediate preceding frame of the same video. However, as it is clear for a man skilled in the art, it is not necessary that the reference frame, to which motion vectors point, is restricted to the immediately preceding frame. Rather, the reference frame to which the motion vector refers may be separated from the current frame by other frames in time. Further, the reference frame may even be a frame succeeding the current frame in play-back time, but preceding in decoding-time, such as in B-frames. Further, multi-hypothesis prediction may be used. That is, more than one motion vector may be associated with one sub-region, with the prediction resulting from the individual motion-compensated partial predictions, being for example, a weighted sum of the partial predictions. The same applies to the disparity vectors. For example, the disparity vectors of FIG. 6 are shown to point from sub-regions of the second-view video to frames $120_1$ to $120_4$ of the first-view video only. Although, it would be possible to restrict inter-view prediction modes to a certain or certain ones of the views explicitly transmitted within the multi-view data signal, it is also possible that sub-regions of the inter-view prediction mode are present in both videos, the first-view video and the second-view video. This is illustrated by the dotted line pointing from frame $120_2$ to $122_2$. Further, as also been indicated above, more than one explicitly transmitted main view may be present within the multi-view data signal, and accordingly, multi-hypothesis prediction may also be used with respect to sub-regions of the inter-view prediction mode in that more than one disparity vector is associated with a certain sub-region with the reference frames of these disparity vectors being positioned at the same time instance but within different main-view videos. Lastly, it is noted that by way of multi-hypothesis, motion-prediction modes and inter-view prediction modes could be mixed so that at least one disparity vector and at least one motion vector is associated to one and the same sub-region. In this case, the respective mode associated to that sub-region shall be subsumed under the term "inter-view prediction mode" as the sub-region has a disparity vector associated to therewith.

After having described the elements of FIG. 6, the functionality of the intermediate views builder of FIG. 5 with respect to various embodiments is described below with respect to FIG. 6. As already stated above, the intermediate view builder 108 uses the disparity vectors of sub-regions of the inter-view prediction mode in order to reconstruct first portions of the intermediate view video. Different possibilities are available for the intermediate view builder in order to reconstruct these first portions which are indicated as white areas within frames $124_1$ to $124_4$ in FIG. 6. For example, the intermediate view builder 108 may reconstruct the first portions of the intermediate view video in a manner very similar to the processing of inter-view prediction mode sub-regions by the predictive reconstructor 106. That is, the intermediate view builder 108 may map the sample positions of the sub-region of an inter-view prediction mode as prescribed by the associated disparity vector and determine the sample values at these mapped positions within the frame of the same time instance of the neighboring view. Instead of using the disparity vector as is, however, the intermediate view builder 108 scales the vector in accordance with the spatial location of the intermediate view position parameter corresponding to the intermediate view video relative to the view position of the first- and second-view videos. For example, according to FIG. 6, sub-region $132_{111}$, i.e. the upper left sub-region of frame $122_1$, is a sub-region of the inter-view prediction mode. Accordingly, the intermediate view builder 108 maps the sample positions of the sub-region according to a scaled disparity vector, namely the disparity vector associated with that sub-region scaled with a scaling value x determined in the way described, for example, with respect to FIG. 3. At the sample positions thus obtained, the intermediate view builder 108 samples the reconstructed version of frame $120_1$ in order to achieve a reconstruction 136 of a first portion of frame $124_1$ of the intermediate view video.

Alternatively and/or additionally, the intermediate view builder may try to apply the disparity vector in the reverse sense. That is, the intermediate view builder 108 may map the sampled positions of the current sub-region 132$_{111}$ into a direction prescribed by the disparity vector but pointing into the opposite direction and being scaled by 1-κ. Then, the intermediate view builder 108 may sample (or interpolate) the reconstructed sample values of the current frame, i.e. frame 122$_1$, in order to obtain a reconstruction of the first portion 136 of the intermediate view video. In the latter case, the intermediate view builder 108 may restrict the reconstruction to an area where the mapped sampled positions and the current sub-region 132$_{111}$ overlap. As already noted above, the intermediate view builder 108 may combine both possibilities in order to increase the area of portion 136 obtained by exploiting the disparity vector of the current sub-region 132$_{111}$.

By treating all sub-regions of the inter-view prediction mode as explained representatively with respect to sub-region 132$_{111}$, the intermediate view builder 108 obtains the non-shaded areas within frame 124$_1$ to 124$_4$ of the intermediate view video. Obviously, there are remaining portions 138 still to be filled.

In order to fill these remaining portions 138, the intermediate view builder 108 may be configured to finish a reconstruction of the intermediate view video group-of-pictures (GOP) wise, rather than frame-wise, wherein the group may be any group of temporally consecutive pictures irrespective of as to whether the groups are independently decodable from each other, i.e. no picture of one group is reference picture for a subregion of a picture/frame of another group, although the latter case may be advantageous. That is, the intermediate view builder 108 may buffer the first portions 136 of a group of a certain number of consecutive frames of the intermediate view video with, upon having reconstructed the maximum number of portions reconstructable by use of the disparity vectors within the multi-view data signal, using these first portions 136 as supporting points in extra and/or interpolating the remaining portions 138 of the intermediate-view video, the extra and/or interpolation being possible in both a time and/or spatial direction. However, the intermediate view builder 108 may additionally, before or instead of extra and/or interpolation, exploit further information transmitted within the multi-view data signal in order to fill further portions of the remaining portion 138.

For example, the intermediate view builder may be configured to identify spatial portions of the scene where the disparity vectors available may be temporally and/or spatially—namely between views—interpolated. For example, sub-regions 132$_{222}$ and 132$_{422}$ both have disparity vectors associated therewith. The intermediate view builder 108 may decide to temporally interpolate between the disparity vectors associated with these sub-regions so as to obtain a temporally interpolated disparity vector 140 for reconstructing the remaining portion 142 among the remaining portions 138 of the intermediate view video. The intermediate view builder 108 may apply this temporally interpolated disparity vector 140 in the same manner to the reconstructed portions of frames 120$_3$ and 122$_3$ of the first- and second-view videos as described above with respect to the original disparity vectors explicitly transmitted within the multi-view data signal.

Similarly, the intermediate view builder 108 may spatially interpolate between the disparity vectors associated with sub-regions 132$_{211}$ and 132$_{231}$ in order to obtain a spatially interpolated disparity vector for the portion 144 among the remaining portions 138 of the intermediate view video and apply this spatially interpolated disparity vector in the same manner as described above with respect to the other disparity vectors.

As has already been indicated above, the multi-view data signal may contain reliability data for each disparity vector and/or motion vector in order to signal to the hybrid video decoder the likelihood that the disparity vector transmitted within the multi-view data signal actually matches the actual disparity between the views, rather than representing only an accidental similarity between portions of neighboring views transmitted within the multi-view data signal. In this regard, the intermediate view builder 108 may be configured to exclude disparity vectors extracted from the multi-view data signal for sub-regions from the reconstruction of portions of the intermediate-view video, for which the reliability data extracted from the multi-data signal fails to fulfill a predetermined minimum requirement, i.e. its reliability is too low.

The additional reliability data may be hidden in the multi-view data signal within portions thereof which are ignored by hybrid video decoders not being able to perform the intermediate view synthesis just described. Lastly, it is noted that, for example, hidden in the just-mentioned portion of the multi-view data signal transparent for conventional hybrid video decoders, residual signals for a predetermined set of predetermined intermediate views could be contained. In this case, the intermediate view builder 108 could be configured to, when synthesizing an intermediate view video at such a predetermined intermediate view positioned between the first- and second-view videos, firstly, perform the reconstruction of the frames of the intermediate view video, as just-described above, with then applying the residual signal as obtained from the multi-view data signal via the data signal extractor 92, to the reconstructed frames of the intermediate view video. Although the data to be transferred via the multi-view data signal would increase, the quality of the intermediate view synthesis would also increase. Moreover, a transmission of further disparity data for these predetermined intermediate views would be avoided. Only the residual signal for the frames of these intermediate view videos at the predetermined intermediate views would have to be transmitted within the multi-view data signal, eventually along with the aforementioned reliability data.

Lastly, it is noted that the intermediate view builder could additionally be configured to create frames at intermediate time instances in a manner similar as described above, with using the motion vectors instead of the disparity vectors, however. For example, the positions of a subregion of the motion-compensated prediction mode are mapped according to a motion vector scaled in accordance with the location of the intermediate frame relative to the immediately neighboring frames in time, in order to obtain a portion of these intermediate time frames of the first- and second-view videos. The frames of the intermediate view video at the intermediate time positions could be obtained by way of, for example, extra/interpolation in time of view direction, or determining motion vectors of the intermediate view video by inter-view interpolating the motion vectors of the first and second-view video in order to just mention few possibilities.

In other words, the embodiments described above with respect to FIGS. 4 to 6 enable the extraction of new views by using scaled disparity vectors in the decoding process. All requested views, e.g. for an N-view display can be extracted in parallel by using differently scaled disparity vectors and possibly reliability information. The structure of a possible decoder for which an embodiment was shown in FIG. 5, may be described, in other words, as follows. In particular, same may be based on "classical" video decoding structures, with incorporating, however, additional technology elements. The decoder may receive a compressed bitstream that contains a coded representation of two or more video sequences. An entropy decoding may be applied to the bitstream to extract the quantized transform coefficients, motion/disparity data, reliability data and other control data. In the embodiment of FIG. 5, this entropy decoding may be performed within the data signal extractor 92.

The quantized transform coefficients may then be scaled and an inverse transform may be applied to obtain the difference of prediction residual signal. This may be performed within the aforementioned blocks 94 and 96. To this prediction residual, previously decoded data from temporal or neighboring views is added. The type of information to be added may be controlled by special control data: in the case of intra-coded video data, no previous or neighboring information is available, such that intra-frame reconstruction is applied. For inter-coded video data, previously decoded data from temporally preceding all neighboring views is available. The previously decoded data is shifted by the associated motion vectors and the motion compensation procedure and added to the different signals. The previously decoded data belongs to a neighboring view; the motion data represents the disparity data.

For sake of intermediate view synthesis, the same disparity data may be used in order to synthesize one, or in parallel, several intermediate views. For example, the disparity vectors may be scaled by one or more scaling factors $\kappa_n$, n=1 . . . N. By this measure n differently scaled version of the disparity vectors may be obtained and used to shift the previously decoded data accordingly to reconstruct respective portions 136 of the one or more intermediate views.

In case of residual data being transmitted for the intermediate views, the n-shifted versions may be added to this additionally transmitted different data to generate a number of additional reconstructed frames of views in parallel. As only a few blocks of an image may have been predicted from neighboring views and thus have disparity vectors, while the majority may have been predicted from previous frames, the initial reconstruction may be rather sparse. In addition, the disparity vectors may be unreliable and different from the actual values, as the disparity vectors were initially estimated at the encoder based on overall rate minimization.

Therefore, reliability data may be embedded within the bitstream or multi-view data signal, respectively. This data may be used at the view enhancement or synthesis data stage to judge the reliability of available disparity vectors and possibly omit or refine the more unreliable data. These initial frames or views may further be processed by deblocking filters or possibly enhancement methods, such as hole-filling, edge smoothing, etc., to improve the visual quality. This may be performed in the aforementioned deblocking filters 102 and 104, for example. Also, the sparse data may be filled as described above, such as by temporally preceding data or advanced methods such as disparity or depth estimation to obtain the missing disparity vectors and fill the initially sparse intermediate views. Since N frames or views are available at once, these improvement methods can use available information from all of them. An example is view synthesis: if a new view is to be synthesized between two original views 1 and 2, as shown in FIG. 3, data from view 1 may be shifted to the new position first. The disparity shift however, is different for foreground and background objects, as the shift is inversely proportional to the original scene depth (frontal distance from the camera). Therefore, new background areas become visible in the synthesized view that were not visible in view 1. Here, view 2 can be used to fill this information. In addition, spatial neighboring data may be used, e.g. adjacent background information. After this improvement stage, the reconstructed data may be transferred to an output buffer. Such an output buffer may be positioned at output 90. This buffer may order the decoded data and output the decoded pictures in the correct temporal order with a correct number of synthesized views for each time instance. For the latter, the requested number of views may be signaled via an intermediate view extraction control. Further, the start data may also be used for the next processing cycle to serve as an input to the scalable disparity compensation.

Figure 7:
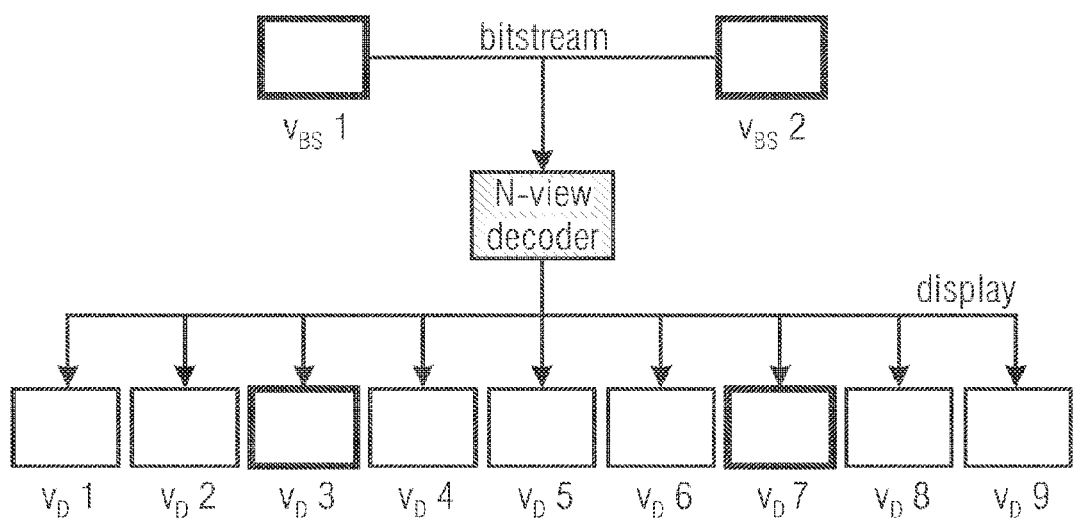
FIG. 7 shows a schematic diagram illustrating an N-view decoding scheme of a 2-view bitstream for a 9-view display in which the hybrid video decoder of FIG. 5 could be employed.

The hybrid video decoder of FIG. 5 may thus be used as an N-view decoder as shown in FIG. 7. Here, the bitstream which contains two views vBS1 and $v_{BS2}$, are to be decoded by the N-view decoder for a 9-view display with views $v_D1$, $v_D2, \ldots, v_D9$, with the 9-view decoder being implemented as for example described above with respect to FIG. 5. The display signals the number of spatial positions or views via the intermediate view extraction control. Here, nine views are needed with a spatial distance of 0.25 when measured in units of the inter-view distance between views $v_{BS1}$ and $v_{BS2}$, such that neighboring display views such as via and $V_{D3}$, are 4× closer together in terms of spatial position and stereoscopic perception than the views in the bitstream. Therefore, the intermediate view builder may use a set of view extraction factors $\{k_1, k_2, \ldots, k_9\}$ being set to $\{-0.5, -0.25, 0, 0.25, 0.5, 0.75, 1, 1.25, 1.5\}$. In order to scale the disparity vectors and reconstruct the frames of intermediate view videos there from. As shown, bitstream views $v_{BS}1$ and $v_{BS}2$ coincide in their spatial position with the display views $V_{D3}$ and $v_{D7}$ as $\kappa_3=0$ and $\kappa_7=1$. Furthermore, factors $v_D3$, $v_D4$ and $v_D5$ are interpolated between $d_{BS}1$ and $v_{BS}2$. Finally, $v_D1$ and $v_D2$ as well as $v_D8$ and $v_D9$ are extrapolated a teach side of the bit stream pair $v_{BS}1$, $v_{BS}2$. With the set of view extraction factors, the disparity vectors between $v_{BS}1$ and $v_{BS}2$ are scaled accordingly to obtain 9 differently shifted versions of previously decoded data. Together with the new difference data from the scaling/inverse transformation block in the decoder, 9 new views are provided for the deblocking/post processing block. The final 9 views are then provided to the display via the output picture buffer.

Thus, the above embodiments describe a method for view extraction from compressed domain video data, where the extracted views can be different from the views contained in the compressed representation or bitstream in terms of view number and spatial position. In contrast to current state-of-the-art methods, no geometry extraction, such as depth estimation, was needed beforehand. Instead, information contained in the compressed representation was used for view extraction, such as the motion and disparity vectors. In addition, the bitstream may also contain reliability information about the motion/disparity vectors in order to judge the suitability of these vectors for correct additional view synthesis. These vectors are embedded in the compressed bitstream in classical video coding approaches, such as multi-view video coding.

Thus, the above embodiments can be used to directly generate different views at the requested intermediate position in an efficient manner. Thus, different multi-view displays can use the same compressed representation and no additional external processing is needed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive encoded video signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. A decoder for decoding multi-view data, comprising:
an extractor configured to:
receive multi-view data comprising data related to a first-view video and a second-view video,
obtain, from the multi-view data, a disparity vector associated with a sub-region of a first frame of the second-view video, wherein the disparity vector indicates a spatial displacement of the sub-region of the first frame of the second-view video with respect to a second frame of the first-view video, wherein the first and second frames are captured at a same time instant, and
reconstruct, based on the multi-view data, a portion of the second frame of the first view video; and
a view synthesizer configured to:
determine a scaled disparity vector using the disparity vector and a scaling factor, and
reconstruct a portion of a third frame of a third-view video using the reconstructed portion of the second frame of the first view video and the scaled disparity vector.

2. The decoder of claim 1, wherein the scaling factor is a value between 0 and 1, and the view synthesizer is configured to multiply the disparity vector with the scaling factor to determine the scaled disparity vector.

3. The decoder of claim 1, wherein the scaling factor is a value less than 0 or greater than 1, and the view synthesizer is configured to multiply the disparity vector with the scaling factor to determine the scaled disparity vector.

4. The decoder of claim 1, wherein the scaling factor depends on a spatial location of a third view corresponding to the third-view video relative to a first view corresponding to the first-view video and a second view corresponding to the second-view video.

5. The decoder of claim 1, further comprising a predictive reconstructor configured to reconstruct the sub-region of the first frame of the second-view video based on the reconstructed portion of the second frame of the first-view video, the disparity vector, and a prediction residual associated with the sub-region obtained from the multi-view data.

6. The decoder of claim 1, wherein the view synthesizer is further configured to extrapolate or interpolate another portion of the third frame of the third-view video based on the reconstructed portion of the third frame of the third-view video.

7. The decoder of claim 1, wherein the view synthesizer is further configured to:

determine an interpolated disparity vector based on a plurality of disparity vectors associated with different sub-regions of the second-view video, and reconstruct another portion of the third frame of the third-view video using the reconstructed portion of the second frame of the first view video and the interpolated disparity vector.

8. The decoder of claim 7, wherein the different sub-regions of the second-view video belong to a same frame of the second-view video.

9. The decoder of claim 7, wherein the different sub-regions of the second-view video belong to different frames of the second-view video.

10. The decoder of claim 1, wherein the extractor is further configured to extract, from the multi-view data, reliability data indicating a reliability factor for the disparity vector, wherein the view synthesizer is configured to reconstruct the portion of the third frame of the third-view video based on the reliability data satisfying a predetermined requirement.

11. An encoder for encoding multi-view data, comprising:
a prediction unit configured to encode multi-view data comprising data related to a first-view video and a second-view video,
wherein to encode the multi-view data, the prediction unit is at least configured to determine a disparity vector associated with a sub-region of a first frame of the second-view video, and a prediction residual associated with the sub-region based on the disparity vector, the disparity vector indicating a spatial displacement of the sub-region of the first frame of the second-view video with respect to a second frame of the first-view video, and the first and second frames are captured at a same time instant; and
a data signal generator configured to insert the multi-view data including the disparity vector and the prediction residual into a data stream,
wherein data associated with a portion of the second frame of the first-view video and a scaled disparity vector are used to synthesize a portion of a third frame of a third-view video, and the scaled disparity vector is determined using the disparity vector and a scaling factor.

12. The encoder of claim 11, wherein the scaling factor is a value between 0 and 1, and the scaled disparity vector is determined by multiplying the disparity vector with the scaling factor.

13. The encoder of claim 11, wherein the scaling factor is a value less than 0 or greater than 1, and the scaled disparity vector is determined by multiplying the disparity vector with the scaling factor.

14. The encoder of claim 11, wherein the scaling factor depends on a spatial location of a third view corresponding to the third-view video relative to a first view corresponding to the first-view video and a second view corresponding to the second-view video.

15. The encoder of claim 11, wherein the synthesized portion of the frame of the third view video is used to extrapolate or interpolate another portion of the third frame of the third-view video.

16. The encoder of claim 11, wherein an interpolated disparity vector is determined based on a plurality of disparity vectors associated with different sub-regions of the second-view video, and another portion of the third frame of the third-view video is synthesized using the synthesized portion of the second frame of the first view video and the interpolated disparity vector.

17. The encoder of claim 16, wherein the different sub-regions of the second-view video belong to a same frame of the second-view video.

18. The encoder of claim 16, wherein the different sub-regions of the second-view video belong to different frames of the second-view video.

19. The encoder of claim 11, wherein the prediction unit is further configured to encode, as part of the multi-view data, reliability data indicating a reliability factor for the disparity vector, wherein the portion of the third frame of the third-view video is synthesized based on the reliability data satisfying a predetermined requirement.

20. A method for decoding a video comprising:
receiving multi-view data comprising data related to a first-view video and a second-view video;
obtaining, from the multi-view data, a disparity vector associated with a sub-region of a first frame of the second-view video, wherein the disparity vector indicates a spatial displacement of the sub-region of the first frame of the second-view video with respect to a second frame of the first-view video, wherein the first and second frames are captured at a same time instant;
reconstructing, based on the multi-view data, a portion of the second frame of the first view video;
determining a scaled disparity vector using the disparity vector and a scaling factor; and
reconstructing a portion of a third frame of a third-view video using the reconstructed portion of the second frame of the first view video and the scaled disparity vector.

21. A method for encoding a video comprising:
encoding multi-view data comprising data related to a first-view video and a second-view video, the encoding multi-view data comprising:
determining a disparity vector associated with a sub-region of a first frame of the second-view video, the disparity vector indicating a spatial displacement of the sub-region of the first frame of the second-view video with respect to a second frame of the first-view video, the first and second frames are captured at a same time instant, and
determining a prediction residual associated with the sub-region based on the disparity vector; and
inserting the multi-view data including the disparity vector and the prediction residual into a data stream,
wherein data associated with a portion of the second frame of the first-view video and a scaled disparity vector are used to synthesize a portion of a third frame of a third-view video, and the scaled disparity vector is determined using the disparity vector and a scaling factor.

22. A computer program stored on a non-transitory computer-readable medium comprising a program code for performing, when executed on a computer, a method according to claim 20.

23. A computer program stored on a non-transitory computer-readable medium comprising a program code for performing, when executed on a computer, a method according to claim 21.

24. A non-transitory computer-readable medium for storing data associated with a video, comprising:
a data stream stored in the non-transitory computer-readable medium, the data stream comprising multi-view data including at least a first-view video and a second-view video, the multi-view data comprising a disparity vector associated with a sub-region of a first frame of the second-view video, and a prediction residual associated with the sub-region determined based on the disparity vector, wherein the disparity vector indicates a spatial displacement of the sub-region of the first frame of the second-view video with respect to a second frame of the first-view video, the first and second frames are captured at a same time instant, data associated with a portion of the second frame of the first-view video and a scaled disparity vector are used to synthesize a portion of a third frame of a third-view video, and the scaled disparity vector is determined using the disparity vector and a scaling factor.

\* \* \* \* \*